United States Patent [19]

Hamper et al.

[11] 3,954,423

[45] May 4, 1976

[54] QUICK START DEVICE FOR REFORMED-GAS GENERATORS

[75] Inventors: Hans Hamper, Erlangen; Christian Koch, Nurnberg-Grossgrundlach, both of Germany

[73] Assignee: Siemens AG, Munich, Germany

[22] Filed: Feb. 6, 1974

[21] Appl. No.: 439,883

[30] Foreign Application Priority Data

Feb. 7, 1973 Germany .......................... 2306025

[52] U.S. Cl. .......................... 48/107; 23/288 K; 123/3; 431/170; 431/328

[51] Int. Cl.[2] .......................... C01B 2/16

[58] Field of Search .......................... 23/288 R, 288 K; 431/170, 287, 328; 123/1 A, 3, 119 E; 48/107, 93, 95, 212, 196 R

[56] References Cited

UNITED STATES PATENTS

| | | | |
|---|---|---|---|
| 2,044,544 | 6/1936 | Rathburn | 48/107 |
| 2,483,132 | 9/1949 | Gaucher | 48/212 |
| 2,749,223 | 6/1956 | Harrington | 48/212 |
| 2,846,296 | 8/1958 | Hasche | 48/196 R |
| 2,868,632 | 1/1959 | Milbourne | 48/196 R |
| 2,915,377 | 12/1959 | Reichhelm | 48/107 |
| 3,798,005 | 3/1974 | Koch | 23/288 R |
| 3,810,732 | 5/1974 | Koch | 431/328 X |
| 3,828,736 | 8/1974 | Koch | 123/119 E |

FOREIGN PATENTS OR APPLICATIONS

| | | | |
|---|---|---|---|
| 551,027 | 1/1927 | Australia | 48/212 |

*Primary Examiner*—S. Leon Bashore
*Assistant Examiner*—Peter F. Kratz
*Attorney, Agent, or Firm*—Kenyon & Kenyon Reilly Carr & Chapin

[57] ABSTRACT

The invention concerns a device for quick starting a reformed gas converter. A first fuel nozzle vaporizes fuel supplied thereto and directs the fuel towards a flame tray. An oxygen carrying gas is combined with the vaporized fuel and the mixture is ignited by a suitable ignition device. The hot gases generated permeate through the device to pre-heat a catalytic converting material such as a perforated sintered block. A second fuel nozzle, after the converting material has been pre-heated to a minimum temperature, directs a stream of vaporized liquid fuel against the heated block. The reform gas generated passes into the reform gas generator proper as fuel therefor. By control of the combustion temperature, the hot gases generated by the ignition step when they pass through the sintered block will also be partially converted to reform gas, suitable for fuel for the generator proper, thereby allowing immediate operation of the generator.

3 Claims, 1 Drawing Figure

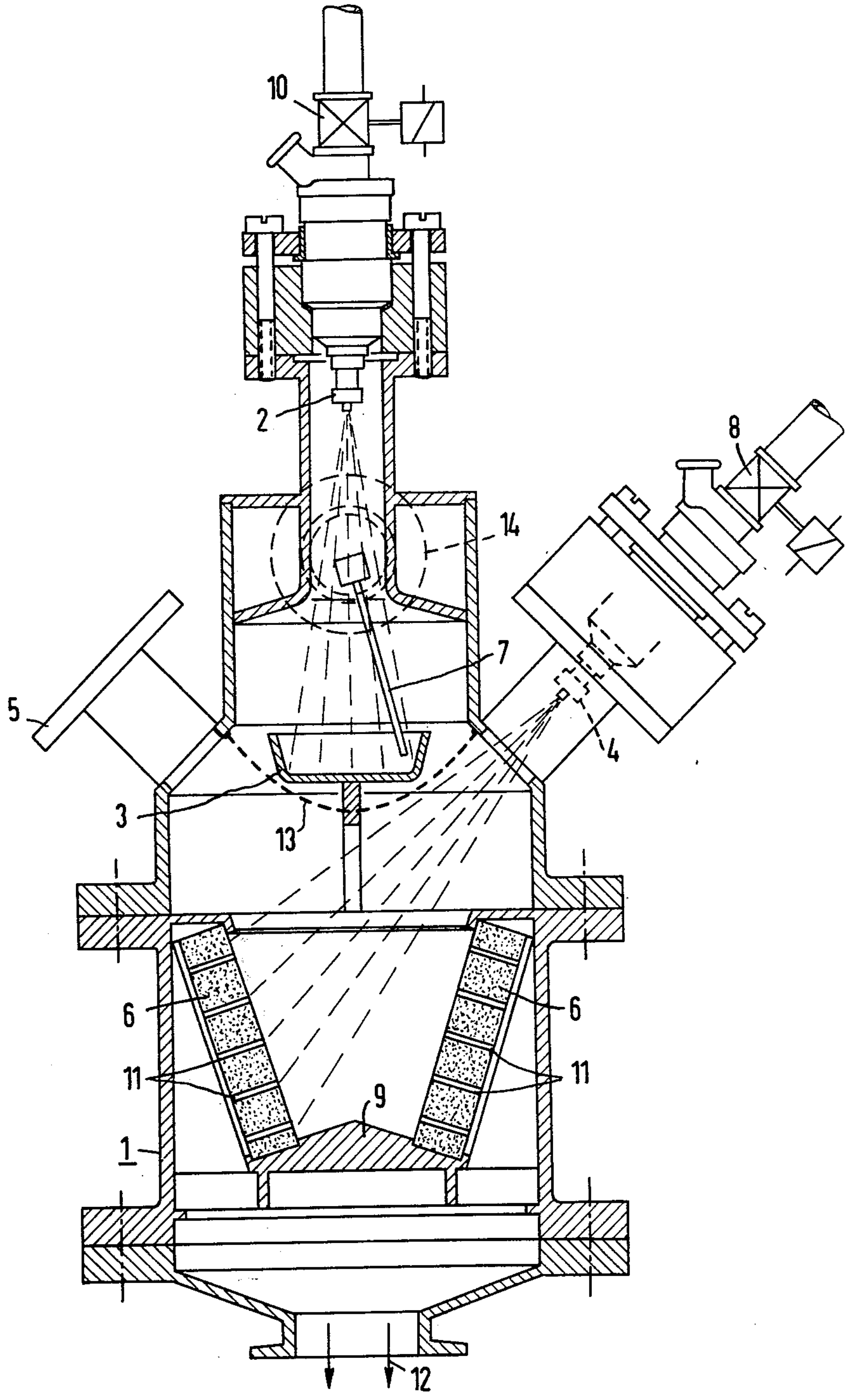
10
2
8
14
7
5
4
3
13
6
6
11
11
9
1
12

QUICK START DEVICE FOR REFORMED-GAS GENERATORS

BACKGROUND OF THE INVENTION

1. Field of The Invention

The present invention concerns reformed-gas generators (gas converters), but particularly a quick-start device for such generators.

2. Description of the Prior Art

A reformed-gas generator is understood to be an arrangement for generating fuel gas, particularly for the operation of an internal-combustion engine. In the generator, fuel and primary air or exhaust gas are catalytically coverted into a fuel gas (reformed gas), which is subsequently burned with secondary air, for instance, in the combustion chambers of the internalcombustion engine.

In the U.S. patent applications, Ser. Nos. 218,696 now U.S. Pat. No. 3,828,736 and 270,923 and now abandoned the principle of the reformed-gas generator (gas converter) was proposed. Therein it is disclosed how a gaseous fuel is generated by chemical conversion of liquid fuel. The fuel, which contains liquid hydrocarbons, such a gasoline, is evaporated, gasified or atomized. The gaseous or vaporous fuel obtained in this manner, together with partial quantities of fed-back exhaust gases of the internal-combustion engine and other gases, such as air, serving as oxygen carriers which are employed for sootfree convertion, are conducted over a catalyst positioned in a suitable carrier. The catalyst lies between its starting temperature, i.e., the lowest possible operating temperature which may, for instance, be about 150° C, and its temperature-wise load limit. Passage over the catalyst converts the vaporous fueloxygen carrier mixture into a gas mixture containing carbon monoxide, carbon dioxide, methane and/or hydrogen, which has been identified as the so-called reformed gas. Prior to introduction into the combustion chambers of the internal-combustion engine, additional oxygen carrying gas, such as air, is mixed with the reformed gas.

The reaction zone wherein the convertion to reformed gas takes place, is in general a catalytic chamber which utilizes as the catalyst carrier, highly porous sintered bodies which have a plurality of essential parallel, passage canals for the gas. A suitable perforated sintered block is described, for instance, in the German Offenlegungsschrift 1, 939,535. Due to this type of construction, the reformed-gas generators can be miniaturized in such a manner that they are well suited for use in motor vehicles. In addition, operation particularly low in harmful emissions can be achieved with such reformed-gas generators, thereby providing suitable operation under stringent environmental restrictions. In order to limit the starter time, present gas generators require a large amount of thermal energy. This is because the catalytic carrier must first be raised to at least the minimum operating temperature specified above.

Additionaly, it would be advantageous if the gas produced during the start-up process could be used as fuel gas in the gas generator proper, e.g. and internal combustion engine. If this were the case, at least a part of the engine output could be delivered during the starting process.

It is therefore an object of the present invention to describe a start-up device which quickly heats up the reformed gas generator.

It is a further object of this invention to provide a start-up device which takes over the gas production for the internal-combustion engine until the reformed-gas generator itself accomplishes the gas production.

SUMMARY OF THE INVENTION

This invention concerns an apparatus to be used as a quick-start device for reformed-gas generators. It is comprised of a first fuel injection nozzle which vaporizes the liquid fuel which is supplied to it and directs the vaporized fuel to a flame tray wherein the fuel is ignited by a suitable ignition device. The hot gases generated by the ignition of the vaporized fuel disburse throughout the apparatus and heat a catalytic converting material such as a perforated sintered block. A second fuel injection nozzle, after sufficient time is allowed for raising the temperature of the catalytic converting material to a predetermined minimum temperature directs the fuel vaporized by itself towards said heated catalytic material to produce reformed gas.

Means are provided for controlling the air supply necessary for the ignition of the vaporized fuel emanating from the first nozzle means. Through control of this air supply, the temperature of the catalytic converter can be regulated such that during the time when the hot gases are being generated, the converter is also converting a portion of those gases into a suitable fuel gas for use in the reformed-gas generator proper.

Additional means are provided for cutting off completely the air supply and the fuel supply or both to the quick-start device, once the reformed-gas generator proper becomes self sustaining.

BRIEF DESCRIPTION OF THE DRAWING

The invention will now be explained in further detail with reference to the FIGURE, which shows in an elevational, sectional view the quick-start device in accordance with the invention.

DESCRIPTION OF THE PREFERRED EMBODIMENT

The quick-start device 1, which precedes a reformed-gas generator, has a first fuel injection nozzle 2 and a flame tray 3. The fuel atomized by the nozzle 2 is collected in the flame tray 3 and is ignited by an ignition device 7, e.g., two ignition electrodes. The air required for combustion is supplied via the tube connection 14, shown in phantom.

4 designates a second fuel injection nozzle similar to 2, which is arranged in the quick-start device in such a manner that the fuel atomized by it strikes the inside of a perforated sintered block 6 in the shape of a truncated cone, which is closed off by a plate 9 at its lower end. Alternately, the sintered block 6 may be one or a plurality of flat plates positioned such that the atomized fuel must pass therethrough. An additional fuel injection nozzle, similar to the injection nozzle 4, can be arranged at the tube connection 5 if required.

13 designates a screen or perforated sheet which delineates the flame chamber and improves the combustion in the flame chamber through reflection of heat.

The hot gases produced by the flame in the flame tray 3 pass through holes 11 in the perforated sintered block 6. This heats the block above the starting temperature of the catalyst used. Nozzle 4, which is switched on after the starting temperature is reached, provides the atomized fuel which combines with the air supplied by tube connection 14. The mixture passes through the heated sintered block to form fuel gas.

The hot gases entering into the reformed-gas generator proper, not shown, but which may, for example, be an internal combustion engine, heat the reformed-gas generator to above the starting temperature of the catalyst disposed therein and supply at the same time fuel gas for the internal-combustion engine, so that the internal-combustion engine can be started immediately.

The quantity of air fed in via the tube connection 14 must be smaller in this situation than the amount of air necessary for stoichiometric combustion of the fuel.

The soot-producing flame ignited in the flame tray 3 burns only for a short time. Although the soot produced in this process deposits itself on the perforated sintered block 6 and in the reformed-gas generator, it is consumed in the later operation. After about 5 to 60 seconds the fuel can be fed in via the injection nozzle 4 and the hot perforated sintered block 6 can take over the production of reformed gas. The nozzle 2 is then turned off by means of the shut-off device 10 and the flame in the tray 3 goes out. Reformed gas is then generated by the sintered blocks 6 until the reformed-gas generator has reached the operating temperature. Once the reformed-gas generator is hot, the fuel vapor which must be supplied to the reformed-gas generator is produced by means of an exhaust gas heat exchanger which follows the reformed-gas generator and which is supplied liquid fuel. Once this fuel vapor can be generated and subsequently converted to fuel gas in the reformed-gas generator proper, the quick-start device can be turned off. The turning-off of the quick-start device is accomplished, for instance, by a switching device, e.g., 8, which turns off the fuel supply, or by a device not shown, which turns off the air supply to the quick-start device, or both.

If it is not necessary that combustible gas be available to the internal-combustion engine from the start, i.e., immediately after the quick-start device is turned on, the combustion of the fuel in the flame tray 3 can also take place overstoichiometrically and soot-free up to the starting temperature of the catalyst in the sintered blocks. However, after the starting temperature is reached, the ratio of the fuel now injected via the nozzle 4 to the amount of air supplied via the tube connection 14 must again be proportioned so that a combustible reformed gas is produced by the perforated sintered blocks 6.

The reformed-gas generator may have several stages and can be constructed as is described in the U.S. Patent Application Ser. No. 372,422 now U.S. Pat. No. 3,897,225. The same perforated sintered blocks, for instance, are suitable for the quick-start device as for the reformed-gas generator itself. Other variations in the construction above will be obvious to those skilled in the art without departing from the invention as defined in the appended claims.

What is claimed is:

1. A rapid starting device for a reformed gas generator comprising:

a. first means for injecting and atomizing liquid fuel supplied thereto;

b. a flame dish arranged relative to said first means for injecting and atomizing such that the flame dish will receive atomized fuel from said first means for injecting and atomizing;

c. means for supplying an oxygen carrying gas;

d. means for igniting the atomized fuel collected in said flame dish to produce hot gases;

e. second means for injecting and atomizing fuel supplied thereto;

f. a catalyst for the catalytic conversion of liquid fuel, arranged relative to said second means for injecting and atomizing such that the fuel atomized by said second means for injecting and atomizing, is directed toward said catalyst;

g. means to conduct hot gases produced in said flame dish toward said catalyst to heat up said catalyst;

h. means to couple fuel supply to said second means for injecting and atomizing when said catalyst is heated to the temperature necessary for the fuel to react; and i. means to couple the fuel supply to said first means for injecting and atomizing, said latter means to couple including means to turn off the fuel supply when said fuel supply is coupled to said second means for injecting and atomizing.

2. The apparatus of claim 1 wherein said catalyst has a carrier said carrier comprising a perforated sintered block having a truncated cone shape.

3. The apparatus of claim 1 wherein said igniting means further comprise means for defining a chamber wherein said ignition takes place, said chamber defining means also improving combustion of said ignited mixture through reflection of heat back into said chamber.

* * * * *